United States Patent [19]

Darr

[11] Patent Number: 4,802,295

[45] Date of Patent: Feb. 7, 1989

[54] BLOW MOLDED POLYETHYLENE TEREPHTHALATE CONTAINER HAVING IML TEXTURED LABEL WALL AND METHOD FOR MAKING SAME

[75] Inventor: Richard C. Darr, Seville, Ohio

[73] Assignee: Plastipak Packaging, Inc., Plymouth, Mich.

[21] Appl. No.: 43,640

[22] Filed: Apr. 28, 1987

[51] Int. Cl.[4] .................. G09F 3/08; B65D 23/00
[52] U.S. Cl. .................... 40/310; 215/1 C; 215/12.2; 40/628; 264/511; 425/504
[58] Field of Search .............. 40/310, 312, 324, 616, 40/628; 215/1 C, 12.1, 12.2; 264/509, 511, 571; 425/503, 504

[56] References Cited

U.S. PATENT DOCUMENTS

| | | | |
|---|---|---|---|
| 2,959,812 | 11/1960 | Allen | 215/12.2 X |
| 3,060,610 | 10/1962 | Stangl | 215/12.2 X |
| 3,108,850 | 10/1963 | Brandt | 264/98 |
| 3,171,559 | 2/1965 | Ferree | 40/310 X |
| 3,207,822 | 9/1965 | Makowski | 264/94 |
| 3,733,309 | 5/1973 | Wyeth et al. | 215/1 C |
| 3,803,275 | 4/1974 | Corsover | 264/28 |
| 3,948,404 | 4/1976 | Collins et al. | 215/1 C |
| 4,387,816 | 6/1983 | Weikman | 215/1 C |
| 4,573,596 | 3/1986 | Slat | 215/12.2 |
| 4,601,926 | 7/1986 | Gabarin et al. | 215/1 C X |
| 4,662,528 | 5/1987 | Slat | 215/12.2 |

Primary Examiner—Ira S. Lazarus
Assistant Examiner—Peggy Neils
Attorney, Agent, or Firm—Brooks & Kushman

[57] ABSTRACT

A blow molded polyethylene terephthalate container (20) is disclosed as having a noncylindrical wall (28) to which at least one label (38) is secured with a textured surface provided by an in-mold labeling operation that prevents label shifting during the blow molding operation. The textured label surface includes isolated depressions (53) that are defined by mold projections (72) which define mold passages (74) through which a vacuum is drawn to provide the label securement. The label and wall depressions (53) of the container and the mold projections (72) that provide these depressions are preferably arranged in a repeating pattern of rows that are inclined in a crossing relationship preferably at 45 degrees with respect to the vertical direction of the container. Each depression (53) preferably has a square shape formed by the square shape of the associated mold projection such that the vacuum passages (74) have a generally straight shape. During the plastic blow molding, the polyethylene terephthalate is preferably stretched to provide biaxial orientation that strengthens the resultant container.

9 Claims, 2 Drawing Sheets

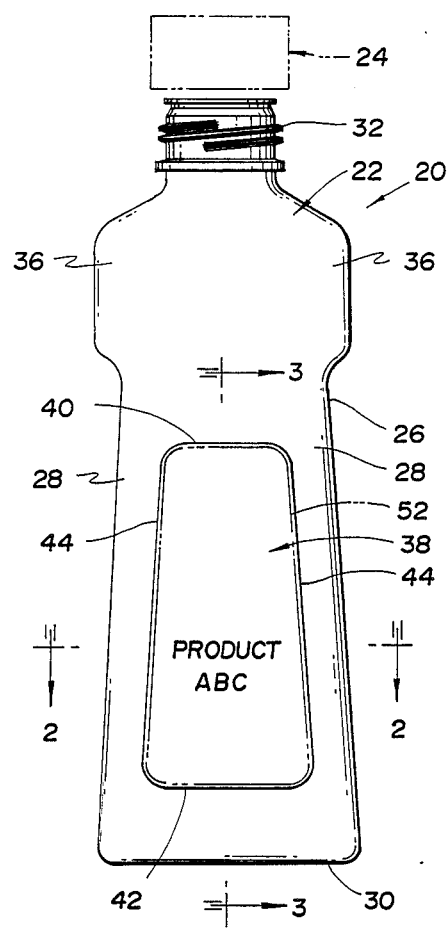
Fig. 1
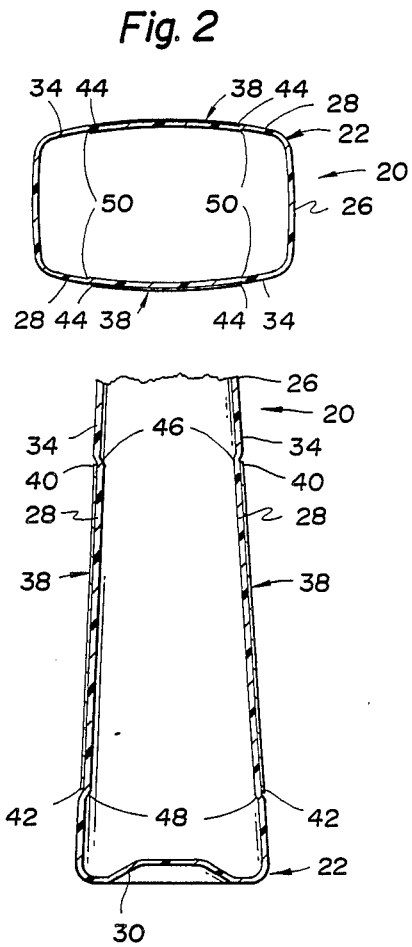
Fig. 2
Fig. 3
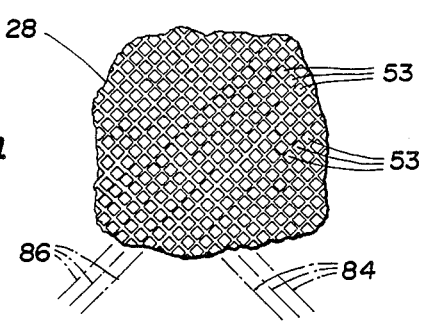
Fig. 4

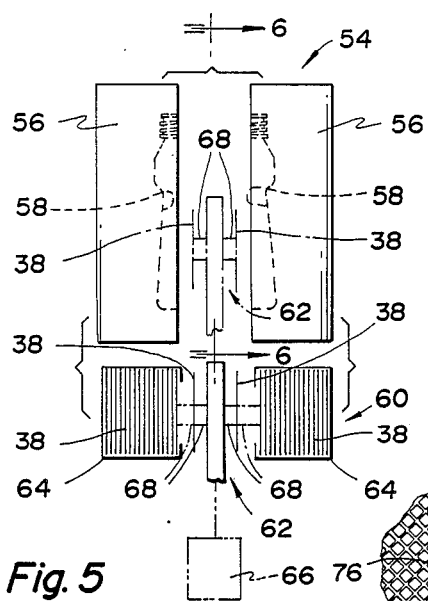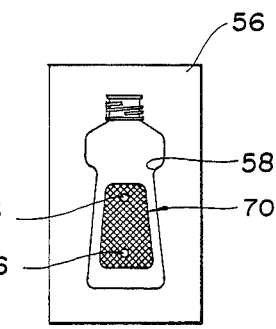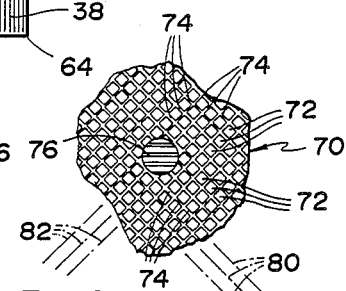
Fig. 5  Fig. 6  Fig. 7
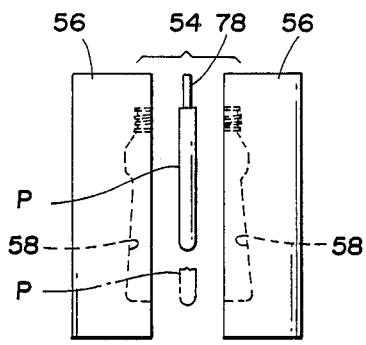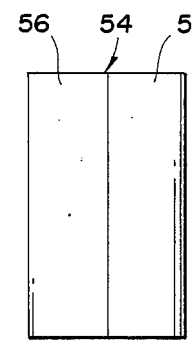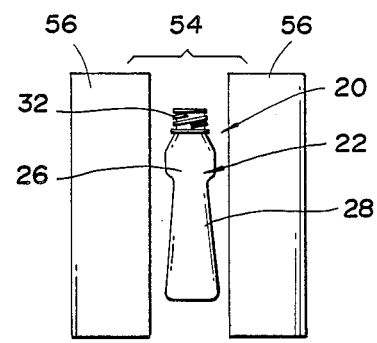
Fig. 8  Fig. 9  Fig. 10
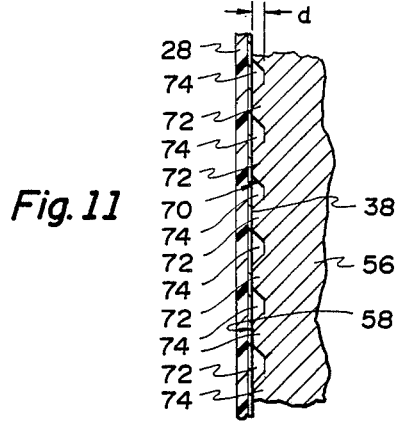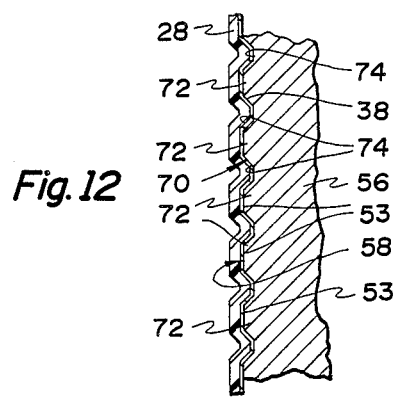
Fig. 11  Fig. 12

BLOW MOLDED POLYETHYLENE TEREPHTHALATE CONTAINER HAVING IML TEXTURED LABEL WALL AND METHOD FOR MAKING SAME

TECHNICAL FIELD

This invention relates to an improved blow molded polyethylene terephthalate container having an in-mold label and also relates to a method for making the labeled container.

BACKGROUND ART

Blow molding machines conventionally operate by introducing a parison, i.e. a tube of hot plastic, between open sections of a mold. Closing of the mold then clamps the parison and allows air to be blown into the parison such that it assumes the shape of the mold. After suitable cooling has taken place, the mold sections are opened to allow ejection of the molded part.

Blow molded parts such as containers have conventionally included paper labels that are glued thereto after the blow molding to identify the contents of the container to the consumer. One problem is that such paper labels can become wrinkled if dampened and can also become detached from the container if a waterproof glue is not used. Also, paper labels require a separate labeling step after the molding which thus adds to the cost of the container.

In-mold labeling of plastic blow molded containers was initially developed in the early 1960's. This in-mold labeling is performed by initially inserting a label within the mold prior to the introduction of the parison and by then closing sections of the mold in preparation for the blowing operation. The subsequent blowing operation forms the parison around the label to the shape of the mold and provides a permanent bond which is incapable of being broken by moisture or otherwise. Also, such in-mold labeling provides a smooth transition between the label and the adjacent surface of the molded plastic part and further provides additional strength since the label cooperates with the plastic in resisting deformation.

U.S. Pat. No. 3,108,850 Brandt discloses a relatively early plastic container made by blow molding with an in-mold labeling operation. This container is blow molded from a polyethylene parison to which a polyethylene label is applied by the in-mold labeling operation performed during the blow molding process. The label is disclosed as being secured to the mold wall by moisture that largely eliminates the intervening air layer such that an unbalanced air pressure provides the securement. Also, the surface of the label that is engaged by the blown container is disclosed as having ridges, minute points or pyramids which are alleged to provide enhanced securement to the container when both the label and the container are made of polyethylene.

In U.S. Pat. No. 3,207,822 Makowski, cylindrical polyethylene containers are blow molded with an in-mold labeling operation wherein a polyethylene label is disclosed as being secured to the mold wall by a vacuum, an adhesive, static electricity, or by applying a moisturing and air excluding agent such as water. The cylindrical mold wall is also disclosed as having a grooved, waffled, or otherwise roughened surface for enhancing label securement.

Blow molded containers have also more recently been made from polyethylene terephthalate such as disclosed by U.S. Pat. Nos.: 3,733,309 Wyeth et al; 3,802,275 Corsover; and 3,948,404 Collins et al. In the Corsover patent, the polyethylene terephthalate container is made with an amorphous construction while the Wyeth et al and Collins et al disclose cylindrical polyethylene terephthalate containers that are biaxially oriented to provide increased mechanical strength both axially and in a circumferential direction.

DISCLOSURE OF INVENTION

An object of the present invention is to overcome problems involved with in-mold labeling of noncylindrical polyethylene terephthalate containers. When cylindrical containers are blow molded with in-mold labeling, the hot parison is blown out radially at a uniform rate in all directions such that engagement thereof with the mold wall takes place at approximately the same time throughout the entire circumference of the mold. As such, there is no circumferential pulling action of the parison on a label in the mold as the parison is blown to its final shape. However, when noncylindrical walls are blow molded with in-mold labeling, it has been found that the parison can engage the labeled portion of the mold initially such that a circumferential pulling action takes place on the label as the parison is blown to its final shape. This pulling action tends to shift the label even when a vacuum is applied in order to hold the label in place in accordance with conventional technology. Roughening of the container in attempt to distribute the vacuum is not effective when polyethylene terephthalate is utilized since the relatively high mechanical strength of this material is sufficient to very quickly smooth the roughened mold surface such that the vacuum distribution becomes ineffective to hold the label against movement as a result of the pulling action by the parison.

In carrying out the above object, the present invention provides a polyethylene terephthalate container constructed so as to permit effective vacuum distribution for maintaining label registration during in-mold labeling a noncylindrical wall of the container. In addition, the invention involves the method of blow molding the polyethylene terephthalate container with a noncylindrical wall at which the in-mold labeling is performed in a manner that provides accurate label registration.

The container of the invention comprises a blow molding made of polyethylene terephthalate and including a nonclyindrical wall of a generally uniform thickness having an outer surface. At least one label is secured to the outer surface of the wall by in-mold labeling and has upper, lower, and side edges defining junctions with the wall. Adjacent these junctions, the wall has abrupt curvatures at the edges of the label to provide a smooth transition between the label edges and the outer surface of the wall. The outer surface of the wall outside the perimeter of the label haqs a relatively smooth surface finish that provides clarity when clear polyethylene terephthalate is utilized. Within the perimeter of the label, the outer surface of the wall and the label have a textured surface including isolated depressions. These isolated depressions are formed during the blow molding operation by mold surface projections spaced from each other by vacuum passages that are interconnected so as to permit distribution of a vacuum that securely holds the label to prevent movement during the blow molding process despite the noncylindrical construction of the wall so as to thereby provide good label registration with the container.

In the preferred construction, the depressions are arranged in a repeating pattern and are preferably provided by performing an acid etching through a cloth disposed over a label area of the mold cavity in which the blow molding is performed. The preferred construction of the repeating depressions is in rows that are inclined with respect to the container, and the inclined rows preferably cross with each other in opposite directions with a most preferred inclination of 45 degrees with respect to the vertical direction of the container. This construction allows upper and lower vent openings of the mold to effectively distribute the vacuum that securely holds the label during the blow molding of the parison that forms the container with the label adhered thereto after completion of the blow molding.

In the preferred construction disclosed, the depressions each have a generally square shape formed by square projections of the label area of the mold surface at which the vacuum is distributed between the projections.

The plastic blow molding is preferably biaxially oriented by initially stretching the parison along its length to provide axial orientation prior to the blowing that stretches the parison circumferentially to provide circumferential orientation. Such biaxial orientation of the polyethylene terephthalate parison provides a lightweight, high strength container with good clarity and accuracy in label registration as a result of the textured label surface construction previously described.

The method of the invention for in-mold labeling of the plastic blow molded polyethylene terephthalate container with the noncylindrical wall is performed by initially depositing a label within a open mold in a mold cavity section having the textured label area previously described, which includes interconnected passages. A vacumm is drawn at the mold cavity section within the interconnected passages of the textured label area so as to distribute the vacuum over the label and provide securement of the label without shifting. The polyethylene terephthalate parison is introduced into the open mold prior to closing the mold and then blow molding the parison to provide a blow molded container with the noncylindrical side wall to which the label is secured. Thereafter, the closed mold is opened to permit removal of the labeled container.

In performing the method of the invention, the vacuum is preferably distributed through interconnected mold passages that are inclined and cross each other so as to provide effective distribution of the vacuum.

In the preferred practice of the method, the polyethylene terephthalate parison is stretched before the blow molding to provide biaxial orientation of the container after the blow molding is completed.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a front view of a blow molded polyethylene terephthalate container constructed in accordance with the present invention;

FIG. 2 is a horizontal sectional view of the container taken along the direction of line 2—2 in FIG. 1;

FIG. 3 is a partial sectional view taken at a vertical plane along the direction of line 3—3 in FIG. 1;

FIG. 4 is a partial view on a greatly enlarged scale illustrating the construction of the outer surface of the container wall and an associated label;

FIG. 5 is a view that illustrates the manner in which an in-mold labeling operation is performed with a mold in which the container is blow molded;

FIG. 6 is a view of a mold cavity of the mold and is taken along the direction of line 6—6 in FIG. 5;

FIG. 7 is a partial view on a greatly enlarged scale of the mold cavity section illustrating a textured label area for distributing a vacuum that prevents shifting of a label within the mold during the blow molding operation;

FIG. 8 is a view that illustrates the manner in which a polyethylene terephthalate parison is initially positioned between the open mold sections as shown by solid line representation and then stretched to provide axial elongation that ultimately results in biaxial orientation of the resultant container;

FIG. 9 is a view illustrating the mold after closing around the parison for the blow molding operation;

FIG. 10 is a view of the mold after subsequent opening to permit removal of the blow molded container;

FIG. 11 is a sectional view taken through the textured label area of the mold cavity with the label secured thereto and illustrated as the parison just initially contacts the label; and FIG. 12 is a sectional view similar to FIG. 11 but shown after the parison and label are fully formed to the textured condition of the mold.

BEST MODE FOR CARRYING OUT THE INVENTION

With reference to FIGS. 1 through 3 of the drawings, a blow molded container constructed in accordance with the present invention is generally indicated by 20 and includes a blow molding 22 and a cap 24 for closing the container. As is hereinafter more fully described, the blow molding 22 is made of polyethylene terephthalate and includes a body portion 26 having a noncylindrical side wall 28, a closed bottom wall 30, and an upper threaded opening end 32 to which the cap 24 is secured. As illustrated in FIGS. 2 and 3, the noncylindrical side wall 28 of the container body portion 26 has a generally uniform thickness and has an outer surface 34. Adjacent its upper end, the body portion 26 has oppositely projecting shoulders 36 (FIG. 1) below which the lower end of the body portion converges outwardly in a downward direction in both the front-to-rear and the side-to-side directions. This lower end of the container body portion has a laterally elongated configuration provided by the noncylindrical side wall 28 as best shown in FIG. 2. More specifically, the laterally elongated configuration of the side wall 28 has a somewhat rectangular shape with rounded corners and slightly curved sides with the longer front and back sides being of somewhat greater curvature than the shorter lateral sides.

As shown in FIGS. 1 through 3, the container blow molding 22 has a pair of front and back labels 38 secured to the outer surface 34 of the container side wall 28 by an in-mold labeling operation as is hereinafter more fully described. Each label 38 has an upper edge 40, a lower edge 42, and pair of side edges 44. These label edges 40, 42, and 44 define junctions with the wall 28. At these junctions, the container side wall 28 has abrupt curvatures 46, 48, and 50 respectively associated with the upper, lower, and side edges 40, 42, and 44 of the labels. These abrupt curvatures 46, 48, and 50 of the side wall provide a smooth transition at the junctions of the label edges and the outer surface 34 of the side wall 28.

As best illustrated in FIG. 1, the outer surface 34 of the noncylindrical side wall 28 has a relatively smooth surface finish outside the perimeter 52 of the label 38 and thereby enables the container to have good clarity when clear polyethylene terephthalate is utilized. Within the label perimeter 52, the wall 28 and label 38 have a textured surface including isolated depressions 53 best shown in FIG. 4. This texturing provided by the depressions 53 facilitates the in-mold labeling of the container as is hereinafter more fully described.

With reference to FIG. 5, a mold 54 of a blow molding machine is illustrated as having a pair of mold sections 56 of each of which has an enclosed cavity section 58 for defining an enclosed cavity when the mold is moved from the open position shown to a closed position. An in-mold label dispenser 60 associated with the mold 54 is disclosed as having a dispensing head 62 and a pair of label magazines 64 including associated stacks of the labels 38. A drive mechanism schematically indicated at 66 is of the type disclosed by U.S. Pat. Nos. 4,479,770 and 4,639,207 and includes a first drive for moving the dispensing head 62 between the solid line indicated withdrawn position with respect to the mold and a phantom line indicated inserted position between the open mold sections 56. A second drive of the drive mechanism 66 moves a pair of label carriers 68 on the dispensing head 62 between a retracted position that allows the dispenser head movement between the withdrawn and inserted positions and an extended label transfer position that permits the label pickup from the label magazines 64 when in the withdrawn position and subsequent transfer of the labels 38 to the mold cavity sections 58 in preparation for the blow molding operation.

As shown in FIG. 6, each mold cavity section 58 has its mold surface provided with a textured label area 70 that corresponds in size and shape to the label perimeter 52 as illustrated in FIG. 1. This textured label area 70 shown in FIGS. 6 and 7 has spaced projections 72 that define interconnected passages 74. Upper and lower vacuum openings 76 within the textured label area of the mold cavity 58 are connected to a source of vacuum so as to thereby draw a vacuum within the interconnected passages 74 defined by the projections 72. This vacuum is thus fully distributed across the entire extent of the textured area 70 so as to provide good label securement during the blow molding operation. The projections 72 are relatively small in size, e.g. about 20 to 40 per inch, such that the passages 74 do not define too large a gap for the label to bridge.

As illustrated in FIG. 8, the blow molding operation proceeds after the in-mold labeling operation described above by introduction of a polyethylene terephthalate parison P between the open mold sections 56 in alignment with the cavity sections 58. As disclosed, a stretch rod 78 is inserted within the parison and upon mold closing as shown in FIG. 9, provides stretching of the parison to the bottom of the enclosed cavity in order to produce a biaxially oriented container. More specifically, the initial stretching of the parison P provides axial stretching while the subsequent blowing of the parison within the closed mold as shown in FIG. 9 provides circumferential stretching such that both directions are stretched to thereby increase the mechanical strength of the resultant container.

During the blow molding operation in the closed position of FIG. 9, the parison P expands radially in a generally uniform rate in all directions such that the labels 38 are initially engaged due to the close spacing of the front and back sides of the container as compared to their lateral sides as illustrated in FIG. 2. Thereafter, the continued blowing of the parison P provides lateral elongation of the container to the horizontal cross sectional shape illustrated in FIG. 2 while the vacuum drawn in the interconnected mold passages 74 between the mold projections 72 shown in FIG. 7 prevents any movement of the label. Thus, the label 38 is secured over its entire extent so as to prevent the parison from moving the label during the lateral stretching after initially contacting the label. Upon the initial contact, the label 38 and the wall 28 of the parison P will have a configuration as shown in FIG. 11 where the vacuum continues to secure the label. After completion of the blow molding, the parison wall 28 and the label 38 will conform to the textured configuration of the mold as shown in FIG. 12 and thereby provide the isolated label and side wall depressions 53 as previously described. After the blow molding operation is completed and sufficient cooling time has taken place, the mold 54 is open as shown in FIG. 10 to permit removal of the container blow molding 22.

With combined reference to FIGS. 4 and 7, the container depressions 53 that are provided by the mold projections 72 defining the vacuum passages 74 are preferably arranged in a repeating pattern which is best provided by an acid etch that is applied through a cloth to define the textured label area 70 of the mnld as illustrated in FIGS. 6 and 7.

As shown in FIG. 7, the repeating pattern of projections 72 are arranged in rows 80 and 82 that are inclined with respect to the shape of the container cavity section 58 so as to provide the container label and wall depressions 53 shown in FIG. 4 arranged in rows 84 and 86. The inclined rows 80 and 82 of the mold projections 72 cross each other in opposite directions preferably at 45 degrees with respect to the vertical direction of the container. As such, the rows 84 and 86 of the container label and wall depressions 53 also cross each other in opposite directions with the preferable inclination being at 45 degrees with respect to the vertical direction of the container.

As shown in FIG. 7, the mold cavity projections 72 have a generally square shape and thereby provide generally straight interconnected passages 74 that facilitate the vacuum flow for securement of the labels. This generally square shape of the mold projections 72 thus provides the label and wall depressions 53 of the container with a generally square shape as shown in FIG. 4.

It should be appreciated that while front and back labels 38 are illustrated on the container as shown in FIGS. 2 and 3, it is also possible to practice the invention with a single label on one side of the container, two or more labels on one side of the container, or any number of labels on one side of the container and any number of labels on the other side of the container. Also, while the manufacturing of the container as a biaxially oriented polyethylene terephthalate blow molding is the preferred construction, it is also possible to manufacture the container without the axial stretching of the polyethylene terephthalate parison as described in connection with FIG. 8 even though such axial stretching to provide the biaxial orientation is preferred since a stronger final product results.

While the best mode for carrying out the invention has been described in detail, those familiar with the art to which this invention relates will recognize various alternative designs and embodiments for practicing the invention as defined by the following claims.

What is claimed is:

1. A container comprising: a blow molding made of polyethylene terephthalate and including a noncylindrical wall of a generally uniform thickness having an outer surface; at least one label secured to the outer surface of the wall by in-mold labeling and having upper, lower, and side edges defining junctions with the wall; said wall having abrupt curvatures at the edges of the label to provide a smooth transition at the junctions between the label edges and the outer surface of the wall; the outer surface of the wall outside the perimeter of the label having a relatively smooth surface finish; the outer surface of the label and the outer surface of the wall within the perimeter of the label having a textured surface including isolated depressions; and said label and wall within the perimeter of the label having a combined generally uniform thickness.

2. A container as in claim 1 wherein the depressions are arranged in a repeating pattern.

3. A container as in claim 2 wherein the depressions are arranged in rows that are inclined with respect to the container.

4. A container as in claim 3 wherein the inclined rows cross each other in opposite directions.

5. A container as in claim 4 wherein the crossing rows are inclined at 45 degrees with respect to the vertical direction of the container.

6. A container as in claim 5 wherein the depressions each have a generally square shape.

7. A container as in any preceding claim wherein the plastic blow molding is biaxially oriented.

8. A container comprising: a blow molding made of polyethylene terephthalate and including a noncylindrical wall of a generally uniform thickness having an outer surface; at least one label secured to the outer surface of the wall by in-mold labeling and having upper, lower, and side edges defining junctions with the wall; said wall having abrupt curvatures at the edges of the label to provide a smooth transition at the junctions between the label edges and the outer surface of the wall; the outer surface of the wall outside the perimeter of the label having a relatively smooth surface finish; the outer surface of the label and the outer surface of the wall within the perimeter of the label having a textured surface including generally square depressions that are isolated from each other and arranged in crossing rows inclinded at 45 degrees with respect to the container; and said label and wall within the perimeter of the label having a combined generally uniform thickness.

9. A container comprising: a blow molding made of biaxially oriented polyethylene terephthalate and including a noncylindrical wall of a generally uniform thickness having an outer surface; at least one label secured to the outer surface of the wall by in-mold labeling and having upper, lower, and side edges defining junctions with the wall; said wall having abrupt curvatures at the edges of the label to provide a smooth transition at the junctions between the label edges and the outer surface of the wall; the outer surface of the wall outside the perimeter of the label having a relatively smooth surface finish; the outer surface of the label and the outer surface of the wall within the perimeter of the label having a textured surface including generally square depressions that are isolated from each other and arranged in crossing rows inclined at 45 degrees with respect to the container; and said label and wall within the perimeter of the label having a combined generally uniform thickness.

* * * * *

UNITED STATES PATENT AND TRADEMARK OFFICE
CERTIFICATE OF CORRECTION

PATENT NO. : 4,802,295

DATED : February 7, 1989

INVENTOR(S) : Richard C. Darr

It is certified that error appears in the above-identified patent and that said Letters Patent is hereby corrected as shown below:

Column 2, line 2, "3,802,275" should be --3,803,275--.

Column 2, line 58 "hags" should be --has--.

Column 6, line 34 "mnld" should be --mold--.

Column 8, line 16, claim 8 (Amendment Dated June 21, 1988, Page 2, line 23, claim 8), "inclinded" should be --inclined--.

Signed and Sealed this

Eighteenth Day of December, 1990

Attest:

HARRY F. MANBECK, JR.

*Attesting Officer*   *Commissioner of Patents and Trademarks*